United States Patent [19]

Ceccarelli et al.

[11] Patent Number: 5,323,938
[45] Date of Patent: Jun. 28, 1994

[54] PRE-MEASURED LIQUID AND POWDER DISPENSER WITH OVERFLOW LUBE

[75] Inventors: Loreto J. Ceccarelli; Antonio Ceccarelli, both of Brampton, Canada

[73] Assignee: The Authentic Group Inc., Brampton, Canada

[21] Appl. No.: 978,544

[22] Filed: Nov. 19, 1992

[51] Int. Cl.$^5$ ............................................. G01F 11/28
[52] U.S. Cl. .................................... 222/442; 222/456; 222/464; 222/547
[58] Field of Search ..................... 222/207, 211, 424.5, 222/425, 442, 443, 454, 456, 464, 547

[56] References Cited

U.S. PATENT DOCUMENTS

| | | | |
|---|---|---|---|
| 2,114,168 | 4/1938 | Auger | 251/305 |
| 2,282,825 | 5/1942 | Puffer | 251/305 |
| 3,223,295 | 12/1965 | Falerni et al. | 222/456 X |
| 3,229,854 | 1/1966 | Turnquist | 222/442 X |
| 4,684,045 | 8/1987 | Su | 222/456 |
| 4,763,817 | 8/1988 | Lee | 222/211 X |
| 5,078,305 | 1/1992 | Glynn et al. | 222/442 |

*Primary Examiner*—Andres Kashnikow
*Assistant Examiner*—Joseph A. Kaufman
*Attorney, Agent, or Firm*—Bereskin & Parr

[57] ABSTRACT

A dispensing device for dispensing a pre-measured amount of a liquid or a powdered material from a container. The dispensing device fits inside the container and comprises a lower measuring reservoir, a discharge tube, and an upper compartment. The upper compartment couples the device to the mouth of the container and includes a pressure equalizer. The measuring reservoir is suspended inside the container by the discharge tube and upper compartment so that material can move freely around the measuring reservoir. To dispense a pre-measured amount of material, the container is inverted which causes the material to be captured by the measuring reservoir. To facilitate capturing material, the reservoir includes a number of inlet notches. The reservoir also includes an overflow tube. The function of the overflow tube is to meter the amount of material that is captured by releasing any excess which may accumulate when the container is inverted. The device can also include a hinged flap closure to prevent material from entering the discharge tube until the container is inverted. In another embodiment, the bottom of the container includes a collection area situated underneath the measuring reservoir. The collection area facilitates the accumulation of material below the reservoir.

15 Claims, 3 Drawing Sheets

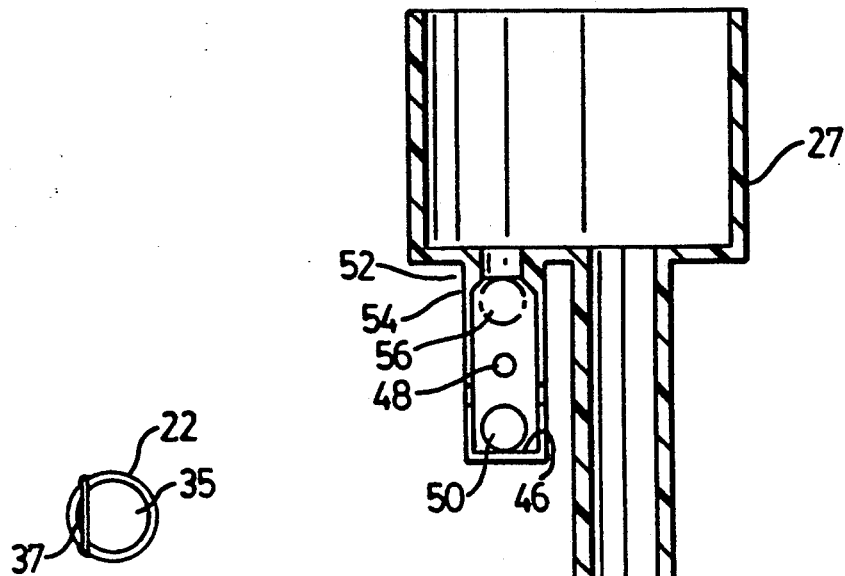
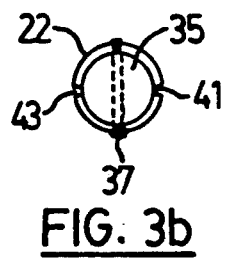
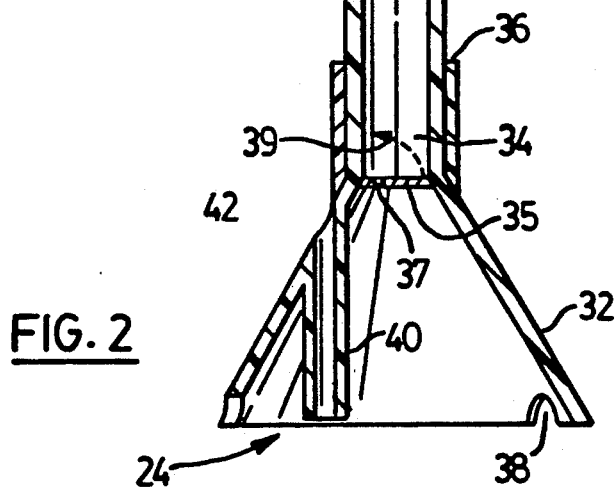
FIG. 3a
FIG. 3b
FIG. 2

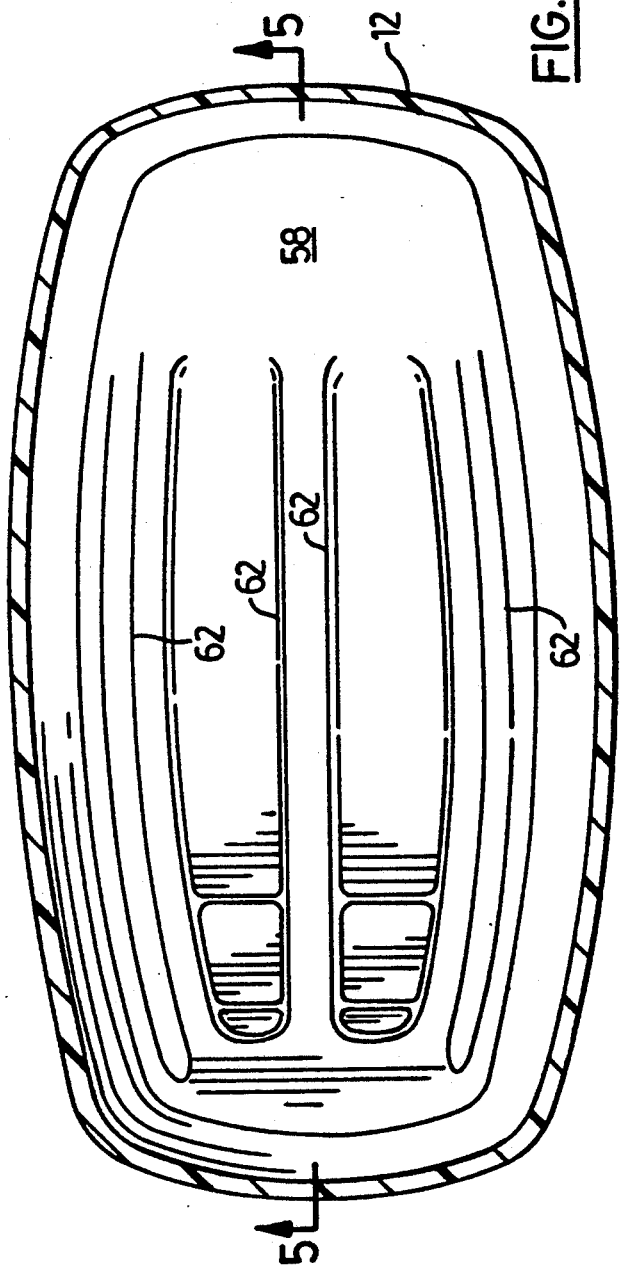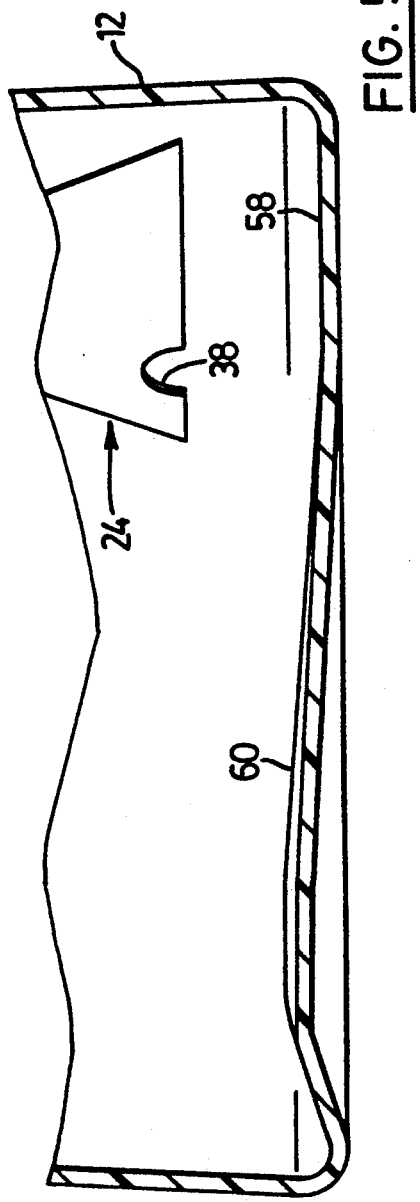

PRE-MEASURED LIQUID AND POWDER DISPENSER WITH OVERFLOW LUBE

FIELD OF THE INVENTION

The present invention relates to a dispensing device. More particularly, it relates to a device for dispensing a pre-measured amount of a liquid or a powdered material from inside a container.

BACKGROUND OF THE INVENTION

The prior art is replete with numerous different devices for dispensing a measured amount of a fluid or powdered material from a container.

For example, Allen in U.S. Pat. No. 2,693,301 teaches a dispenser for dispensing measured quantities of powdered materials such as sugar. The dispenser fits inside a container and includes an elongated tube which has a flared extension at its lower end. The flared extension forms the lower reservoir which is used to capture a pre-measured amount of powder from inside the container. Powder flows into the lower reservoir through a number of inlet tubes. The lower reservoir provides a measured volume for the contents of the container which are emptied when the container is inverted.

There are two apparent problems with the Allen device. First, Allen teaches positioning the lower reservoir tightly against the bottom of the container. It will be appreciated by those skilled in the art that fitting the lower reservoir tightly against the bottom requires closer tolerances and consequently, the manufacturing costs can increase. Secondly, since the inlet tubes are the only conduit for the material to enter the lower reservoir, clogging of these tubes can render the dispensing device inoperable.

Another example of the prior art is Yasso in U.S. Pat. No. 2,704,623. Yasso also teaches a dispensing device which fits inside a container. The dispensing device according to Yasso comprises a vertical tube which fits into the mouth of the container, and a measuring funnel which fits onto the lower end of the tube. The measuring funnel includes a number of inlet notches to allow the material to be dispensed to flow into the funnel. Similar to the teachings of Allen, the measuring funnel according to Yasso rests against the bottom of the container.

As was the case for Allen, the dispenser configuration of Yasso requires close tolerances in order to fit the lower reservoir against the bottom of the container. Furthermore, the lower reservoir, according to Yasso can be prone to clogging which can render the device inoperable. The configuration of the lower reservoir permits granular or large particles of a normally small grained material to fall and collect at the bottom edge of the lower reservoir. These larger particles can clog the notches thereby reducing or preventing accurate dispensing of a measured amount of material.

Ladwig in U.S. Pat. No. 3,224,652 also teaches a dispensing device which fits into a container. The pre-measured dispensing device taught by Ladwig comprises a lower measuring chamber which is connected to the mouth of the container by a vertical dispensing tube. The lower measuring chamber rests on the bottom of the container and includes an inlet for the liquid or powder to enter into the lower measuring chamber. The device also includes a venting tube which determines how much fluid enters the measuring chamber. The venting tube comprises a tube which runs alongside the dispensing tube and is connected to the dispensing tube and the top of the measuring chamber through an inlet. The venting tube determines the amount of fluid which enters the lower chamber.

While Ladwig provides a pre-measured dispensing device, the structure of the Ladwig device is unnecessarily complicated. In the Ladwig device, the venting tube determines the amount of fluid which will enter the lower chamber. As will be appreciated by those skilled in the art, this design unnecessarily complicates the structure and thereby makes the device expensive to manufacture. Furthermore, the device as taught by Ladwig is not well suited for dispensing powdered materials because the venting tube which determines the amount of fluid entering the lower chamber would be easily plugged by particles of powdered material. Therefore, Ladwig teaches a device which is complicated to manufacture and limited to use with liquids or finely powdered materials.

While the known devices discussed above can provide an accurate measurement of a fluid or a powdered material to be dispensed, there are numerous problems associated with these prior devices. First, they are difficult and expensive to manufacture. Secondly, in these known devices the lower reservoir is positioned tightly against the bottom or side of the container. This tight positioning provides a closed volume which is used to capture the pre-determined amount of fluid or powder material. While these devices provide an accurate measuring volume, they can be susceptible to clogging of the lower reservoir which can ultimately render the device inoperable.

SUMMARY OF THE INVENTION

The present invention provides an improved dispensing device to be utilized in combination with a container. The device is suitable for dispensing a liquid or a powdered material. Furthermore, the device can be easily and inexpensively manufactured. The device is adapted to be formed as an integral unit, and the entire assembly can be removed and reused with another container.

In one aspect, the present invention provides a dispensing device for a container having a closed bottom, an opening and a sidewall. The dispensing device is adapted to fit inside the container and dispense a pre-measured amount of a liquid or a powdered material which is held inside the container. The device has: (a) a discharge tube; (b) means for connecting the discharge tube to the opening of the container; (c) a measuring reservoir having an open end and a discharge opening, wherein the discharge opening is connected to the other end of the discharge tube and the open end faces the bottom of the container; and (d) the open end of measuring reservoir has an edge which is positioned in a spaced relationship from the bottom of the container.

In another aspect, the present invention provides a dispensing device adapted to fit inside a container and dispense a pre-measured amount of a liquid or a powdered material which is held inside the container. The dispensing device includes: (a) a container having a bottom, which includes a collection area for collecting the liquid or powdered material; (b) a discharge tube; (c) means for connecting one end of the discharge tube to the opening of the container; (d) a measuring reservoir having an open end and a discharge opening, wherein the discharge opening is connected to the other end of the discharge tube and the open end of the measuring reservoir faces the bottom of the container; and (e) the open end of the measuring reservoir has an edge which is positioned in a spaced relationship from the bottom of the container and positioned substantially over the collection area.

BRIEF DESCRIPTION OF THE FIGURES

For a better understanding of the present invention, and to show more clearly how it may be carried into effect, reference will now be made, by way of example, to the accompanying drawings which show a preferred embodiment of the present invention in which:

FIG. 2 is a central vertical view of the dispensing device of FIG. 1 shown separately from the container;

FIG. 3(a) is a top view of the flap closure shown in FIG. 2;

FIG. 3(b) is a top view of another embodiment of the flap closure of FIG. 3(a);

FIG. 4 is a top plan view of channelling grooves formed in the bottom of the container; and FIG. 5 is a side sectional view through the lower portion of the container taken substantially along a plane as indicated by the line 4—4 of FIG. 4.

DETAILED DESCRIPTION OF THE PREFERRED EMBODIMENTS

Figure 1:
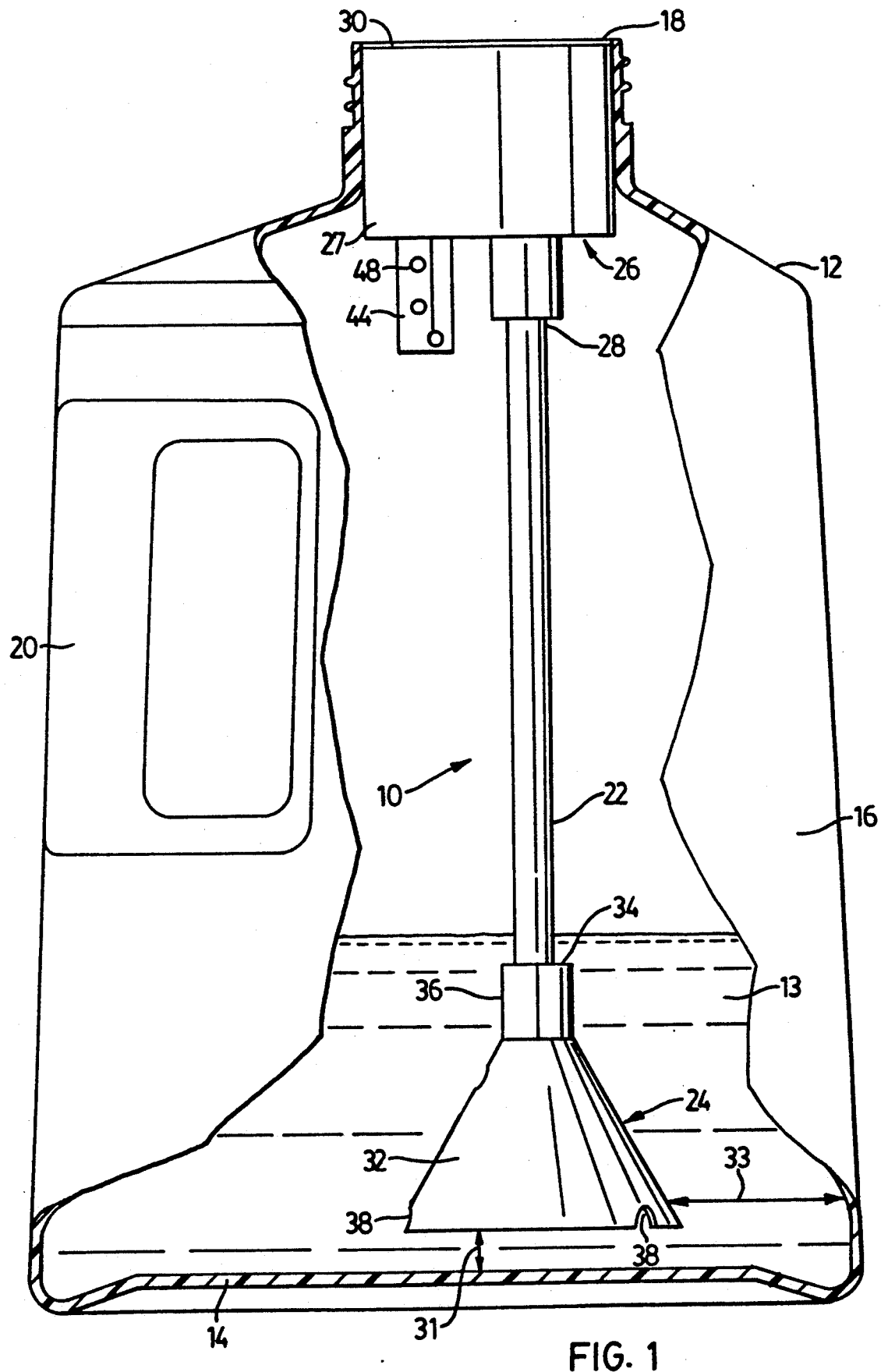
FIG. 1 is a central and vertical sectional view of a container which shows a side perspective of a dispensing device mounted in the container.

Referring to the accompanying drawings, a dispensing device according to the present invention is shown in FIG. 1 and designated by reference 10. The dispensing device 10 according to the present invention is designed to fit inside a container 12. The container 12 is shown as having a bottom 14, a sidewall 16, a mouth or opening 18 and a handle 20. The container 12 is filled with material 13 which is to be used. The dispensing device 10 according to the present invention is capable of dispensing pre-measured amounts of liquid or powdered material 13. In FIG. 1, the sidewall 16 of the container 12 is partially cut away to show the dispensing device 10 mounted inside.

The dispensing device 10 comprises a vertical discharge tube 22, a measuring reservoir 24, and an upper compartment 26. The upper compartment 26 connects the dispensing device 10 to the opening 18 of the container 12. The upper compartment 26 can be shaped as a cup 27 which is dimensioned to securely fit into the opening 18 of the container 12, by utilizing a press-fit for example. The tube 22 is secured to a second opening 28 in the bottom of the cup 27. The cup 27 and tube 22 can also be formed from one integral piece of plastic or assembled as separate components. As shown in FIG. 1, the cup 27 includes a rim 30 which together with the dimensioning of the cup 27 allows the cup to be snapped into the opening 18 of the container 12 for a secure fit. The cup 27 can also be slightly oversized to provide a press-fit inside the opening 18 of the container 12.

The discharge tube 22 couples the measuring reservoir 24 to the mouth 18 of the container 12 and provides a conduit for releasing a pre-measured amount of material 13 from the container 12. The measuring reservoir 24 as shown in FIG. 1 is a funnel 32. The funnel 32 includes an outlet 34 at one end which has a collar 36. The collar 36 is dimensioned such that the other end of the tube 22 can be rigidly secured to the funnel 32.

Referring still to FIG. 1, the measuring reservoir 24 is positioned or suspended above the bottom of the container 12. There is a gap 31 between the open end of the measuring reservoir 24 (or funnel 32) and the bottom of the container 12. The gap 31 permits the material 13 to flow freely under the open end of the measuring reservoir 24 thereby facilitating capture of the material 13 by the reservoir 24 when the container 12 is inverted. Suspending the measuring reservoir 24 above the bottom of the container 12 alleviates the problem of clogging which could occur with the prior art devices. The gap 31 also relaxes the tolerances for manufacturing and assembly of the device 10 which can ultimately reduce the cost. In the preferred embodiment, the gap 31 can be anywhere in the range of 0.25 to 0.75 inches.

As shown in FIG. 1, there is also a gap 33 between measuring reservoir 24 and sidewall 16 of the container 12. For other shapes of containers, the position of the opening 18 can result in the device 10 (and measuring reservoir 24) being situated closer or even touching the sidewall 16. While the gap 33 between the sidewall 16 is not required for the proper functioning of the device 10, the gap 33 can help the flow of material 13 over and around the measuring reservoir 24.

The open end of the funnel 32 includes a number of inlet notches 38. The inlet notches 38 are cut or formed into the bottom edge of the funnel 32. The inlet notches 38 as shown in FIG. 1 are semi-circular in shape and spaced equi-distance along the bottom edge of the funnel 32. The inlet notches 38 can be configured in other shapes, such as triangles (not shown).

The function of the inlet notches 38 is to facilitate capture of the material 13 by the measuring reservoir 24 when the container 12 is inverted. When the container 12 is inverted for dispensing, the notches 38 allow material 13 to flow into the funnel 32 in addition to the material 13 which enters the open end of the funnel 32. In the case of the granular material 13, the material 13 does not tend to fill the measuring reservoir 24 until the container 12 is inverted. The inlet notches 38 facilitate filling the measuring reservoir 24 by allowing the granular material 13 to flow into the measuring reservoir 24 as the container 12 is being turned to the inverted position.

Referring next to FIG. 2, the measuring reservoir 24 also includes an overflow tube designated by the reference 40. The overflow tube 40 is connected to an opening 42 which is cut in the upper portion of the measuring reservoir 24. The overflow tube 40 extends parallel to the longitudinal axis of the tube 22 to a position which is substantially flush with the bottom edge of the measuring reservoir 24. Although the overflow tube 40 is shown parallel to the longitudinal axis of the discharge tube 22, the overflow tube 40 can also be oriented at an angle.

Referring still to FIG. 2, the dispensing device can include a flap closure denoted by reference 35. The flap 35 is located at the lower end of the discharge tube 22 at the juncture with the measuring reservoir 24. The flap 35 is mounted inside the tube 22 using a shaft 37. The shaft 37 provides an axis about which the flap 35 can pivot from a closed to an open position indicated by an arrow 39. The purpose of the flap 35 is to confine the material 13 to the measuring reservoir 24 until the container 12 is inverted. When the container 12 is inverted, the flap 35 is forced to the open position (indicated by arrow 39) and the material 13 captured by the measuring reservoir 24 is free to flow through the tube 22.

The flap 35 is particularly useful for metering specific amounts of a material 13 which is a liquid. A liquid material 13 will have a tendency to move up the tube 22 to the level of the liquid in the container 12. Consequently, if the ratio of the volume of the measuring reservoir 24 to the volume of the discharge tube 22 is low, the liquid level in the container 12 will affect the amount of material 13 which is dispensed by device 10, i.e. when the container 12 is inverted the contents of the tube 22 and the reservoir 24 will be dispensed. However, a material 13, such as a powder, will not have a tendency to rise up the tube 22, and therefore it would not be necessary to include the flap 35.

FIG. 3(a) shows a top view of the flap 35 in the vertical discharge tube 22 (FIG. 2). The shaft 37 connects one end of the flap 35 to the vertical discharge tube 22. In known manner, the shaft 37 is attached to he tube 22 through two holes (not shown) in the sidewall of the tube 22. The flap 35 includes a bore (not shown) which accepts the shaft 37. The bore can be dimensioned so that there is a friction fit which can control the movement of the flap 35 by resisting the pressure of the material 13 when the container 12 is in the upright position, and yielding when the container 12 is inverted. Positioning the flap 35 at the lower end of the discharge tube 22 facilitates assembly of the flap 35. It also allows the volume of the measuring reservoir 24 to determine the amount of material 13 which will be captured and released by the dispensing device 10.

FIG. 3(b) shows a top view of another embodiment of the flap closure 35. As shown in FIG. 3(b), the shaft 37 fits inside a bore (not shown) which runs through the center of the flap 35. To control the movement of the flap 35 in the open and closed positions, the tube 22 can include upper and lower stops denoted by references 41 and 43 respectively. The function of the stops 41, 43 is to prevent the flap 35 from opening until the container 12 is inverted. The stops 41 and 42 can be indentations which are formed in the sidewall of the tube 22. The diameter of the flap closure 35 should be such that there is very little or no gap between the flap 35 and the sidewall of the tube 22. If there is a large gap, material 13 could leak into the tube 22, which will affect the amount of material 13 released by the dispensing device 10.

As shown in FIGS. 1 and 2, the dispensing device 10 also includes a pressure equalizer denoted by reference 44. Since the upper compartment 26 can form an air tight seal when snapped into the mouth 18 of the container 12, there will be a pressure imbalance when the material 13 in the container 12 is released by the dispensing device 10. To counteract this imbalance, the pressure equalizer 44 lets in enough air to maintain a balance between the pressure inside the container 12 and the pressure outside the container 12.

Referring still to FIG. 2, the pressure equalizer 44 can be a simple floating ball arrangement which comprises a cylinder 46 which is connected to the bottom of the cup 27. The cylinder 46 has a number of openings 48 and there is a ball 50 which can freely move inside the cylinder 46. The top of the cylinder 46 includes an inlet 52 and a frusto-conical shaped portion 54. The frusto-conical shaped portion 54 is dimensioned so that the ball 50 completely closes the inlet 52 when the ball 50 is moved to the closed position indicated by the broken line outline of the ball 50 at a position indicated by reference 56. In this position 56, the ball 50 prevents the material 13 in the container 12 from flowing into the cylinder 46 and being released through the inlet 52. When the container 12 is turned right side up, the force of gravity causes the ball 50 to fall back to the bottom of the cylinder 46 and expose the inlet 52. The inlet 52 permits air to bleed into the container 12 until the pressure is equalized. The openings 48 in the cylinder 46 are dimensioned so that air can flow into the interior of the container 12 but the material 13 inside cannot flow through into the cylinder 46. In another embodiment, the openings 48 can be replaced by other known pressure equalization devices such as a bleeder valve (not shown).

Referring to FIGS. 4 and 5, another embodiment of the present invention can be provided by including a collection area 58 in the bottom of the container 12. The collection area 58 is formed (shown in profile in FIG. 5) in one side of the bottom of the container 12. The bottom of the container 12 can also be formed to have an inclined slope designated by reference 60. As shown in FIG. 5, the measuring reservoir 24 is positioned over the collecting area 58.

The purpose of the collection area 58, shown in FIGS. 3 and 4, is to facilitate collecting and capturing the material 13 in the container 12 when the level of the material 13 is running low. The action of gravity will cause the material 13 to migrate into the collection area 58. The measuring reservoir 24 functions in cooperation with the collection area 58 to capture .the material 13 even when the level inside the container 12 is low. The inclined surface 60 helps material 13 move to the collection area 58. To further facilitate the movement of material 13 to the collection area 58, the inclined slope 60 can include grooves 62. The grooves 62 help channel the material 13 to the collection area 58.

When in use, the container 12 is filled with material 13. The material 13 can be a liquid or a powder, such as laundry detergent. Inverting the container 12 using the handle 20 causes a pre-determined amount of the material 13 to be captured by the measuring reservoir 24. The material 13 captured by the measuring reservoir 24 will move through the discharge tube 22 into the upper compartment 26 and out the opening 18 of the container When the container 12 is returned to the upright position, material 13 will again collect in the bottom of the container 12 below the measuring reservoir 24, i.e in the gap 31.

The dimensions of the measuring reservoir 24 determine the amount of material 13 which is captured when the container 12 is inverted. As the container 12 is inverted the inlet notches 38 allow the material 13 to freely enter and be captured by the measuring reservoir 24. Some of the captured material 13 will start to flow down the tube 22 and therefore the precise amount of. material 13 which is captured can vary. To facilitate capturing a metered amount of the material 13 according to the volume of the measuring reservoir 24, the device 10 includes the overflow tube 40. The function of the overflow tube 40 is to release material 13 which has collected (i.e. heaped) in the opening of the measuring reservoir 24 when the container 12 has been inverted. The material 13 which is heaped over the measuring reservoir 24 will be released by the overflow tube 40 to the level of the measuring reservoir 24. By utilizing the overflow tube 40, the dispensing device 10 according to the present invention can provide relatively accurate measured amounts of dispensed liquid or powder, while still providing a device which can be easily and inexpensively manufactured.

It will be appreciated by those skilled in the art that a liquid material 13, especially a non-viscous liquid, will tend to rise up the discharge tube to the level of the liquid in the container 12. When the container 12 is inverted, the liquid in the tube 22 is discharged along with the material 13 which is captured by the lower measuring reservoir 24. There are two ways to meter the amount of material 13 (e.g. liquid) dispensed by the device 10. The first is to include the flap closure 35 described above (with reference to FIGS. 2, 3(a) and 3(b)). Another way of providing a pre-measured amount of material 13 involves designing a high volume ratio measuring reservoir 24 where the volume of the tube 22 is a fraction of the volume of the lower measuring reservoir 24. The amount of liquid material 13 which rises up the discharge tube 22 will then be negligible compared to the material 13 which is captured by the lower reservoir 24. The dimensions of the lower measuring reservoir 24 will determine the amount of material 13 which is released by the device 10. In the case of a powdered or granular material 13, the volume ratio of the measuring reservoir 24 to the discharge tube 22 is not as critical because the granular material 13 will not rise up the tube 22 unless the container is shaken vigorously.

The various components of the dispensing device 10 according to the present invention can be fabricated from any suitable material, such as plastic. For example, the container 12 can be fabricated using a blow molding plastic process. The sloped surface 58 and grooves 62 can be formed as part of the molding process. The vertical discharge tube 22 can be made of extruded plastic; the measuring reservoir 24 and the upper compartment 26 can also be molded separately, each as one piece units. Furthermore, the size and shape of the container 12 can be varied according to the type of material 13 to be dispensed and the quantity of material 13 to be stored in the container 12.

The dimensional design or shape of the measuring reservoir 24 is partly dependent on the shape or configuration of the container 12 and the shape of the bottom of the container 12, and partly dependent upon the desired volume control for obtaining a measured amount of material 13. In the previous description, the measuring reservoir 24 was described as a funnel 32. However, in some applications, the measuring reservoir 24 can comprise an elongated shaped volume-(not shown). As will be appreciated, the amount of material 13 captured by the measuring reservoir 24 will also depend upon the dimensions of the overflow tube 40 and the dimensions of the inlet notches 38.

Although various preferred embodiments of the present invention have been described in detail, it will appreciated by those skilled in the art, that variations may be made to the present invention without departing from the spirit of the invention or the scope of the appended claims.

We claim:

1. A dispensing device for a container having a closed bottom, an opening and a side wall, said dispensing device being adapted to fit inside the container and dispense a pre-measured amount of a liquid or a powdered material which is held inside the container, said dispensing device comprising:
    (a) a discharge tube;
    (b) means for connecting said discharge tube to the opening of the container;
    (c) a measuring reservoir having an open end and a discharge opening, said discharge opening being connected to the other end of said discharge tube and said open end facing the bottom of the container;
    (d) said open end of said measuring reservoir having an edge wherein said edge is positioned in a spaced relationship from the bottom of the container; and
    (e) said measuring reservoir including an overflow tube.

2. The dispensing device claimed in claim 1, further including means for closing the discharge opening of said measuring reservoir when the container is in an upright position.

3. The dispensing device claimed in claim 2, wherein said means for closing comprises a flap, said flap being coupled to said discharge tube by a shaft, said shaft permitting said flap to move between an open position and a closed position.

4. The dispensing device claimed in claim 3, wherein said measuring reservoir includes a plurality inlet notches, said inlet notches being located along the edge of said measuring reservoir.

5. The dispensing device claimed in claim 4, wherein said overflow tube is connected to an opening in said measuring reservoir, and said overflow tube extends to the edge of said measuring reservoir, so that excess material which is captured by said measuring reservoir can flow through said overflow tube.

6. The dispensing device claimed in claim 4, wherein said means for connecting the discharge tube comprises a compartment having a sidewall and a bottom, and an opening in said bottom for coupling said compartment to said discharge tube, said sidewall being dimensioned such that said compartment can be engaged and disengaged from the opening of the container.

7. The dispensing device claimed in claim 6, wherein the edge of said measuring reservoir is positioned in a spaced relationship from the sidewall of the container.

8. The dispensing device claimed in claim 6, wherein said means for connecting the discharge tube includes pressure equalization means.

9. A dispensing device adapted to fit inside a container and dispense a pre-measured amount of a liquid or a powdered material which is held inside the container, said dispensing device comprising:
    (a) a container having a bottom, said bottom including a collection area for collecting the liquid or powdered material;
    (b) a discharge tube;
    (c) means for connecting one end of said discharge tube to the opening of the container;
    (d) a measuring reservoir having an open end and a discharge opening, said discharge opening being connected to the other end of said discharge tube and said open end facing the bottom of the container,
    (e) said one end of said measuring reservoir having an edge wherein said edge is positioned in a spaced relationship from the bottom of the container and positioned substantially above said collection area; and
    (f) said measuring reservoir including an overflow tube.

10. The dispensing device as claimed in claim 9, wherein the bottom of the container includes means for moving the material to said collection area.

11. The dispensing device as claimed in claim 10, further including means for closing the discharge opening of said measuring reservoir when the container is in an upright position.

12. The dispensing device claimed in claim 11, wherein said means for closing comprises a flap, said flap being coupled to said discharge tube by a shaft, said shaft permitting said flap to move between an open position and a closed position.

13. The dispensing device as claimed in claim 12, wherein said overflow tube is connected to an opening in said measuring reservoir, said overflow tube extending to the edge of said measuring reservoir, so that excess material which is captured by said measuring reservoir can flow through said overflow tube.

14. A dispensing device for a container having closed bottom, an opening and a sidewall, said dispensing device is adapted to fit inside the container and dispense a pre-measured amount of a liquid or a powdered material which is held inside the container, said dispensing device comprising:

(a) a discharge tube;

(b) means for connecting said discharge tube to the opening of the container;

(c) a measuring reservoir having an open end and a discharge opening, said discharge opening being connected to the other end of said discharge tube and said open end facing the bottom of the container;

(d) said open end of said measuring reservoir having an edge wherein said edge is positioned in a spaced relationship from the bottom of the container;

(e) said measuring reservoir including an overflow tube connected to an opening in said measuring reservoir, said overflow tube extending to the edge of said measuring reservoir; and (f) means for closing the discharge opening of said measuring reservoir when the container is in an upright position.

15. The dispensing device claimed in claim 14 wherein said means for closing comprises a flap, said flap being coupled to said discharge tube by a shaft, said shaft permitting said flap to move between an open position and a closed position.

* * * * *